US010162966B1

(12) United States Patent
Huang et al.

(10) Patent No.: US 10,162,966 B1
(45) Date of Patent: Dec. 25, 2018

(54) ANTI-MALWARE SYSTEM WITH EVASION CODE DETECTION AND RECTIFICATION

(71) Applicant: Trend Micro Incorporated, Tokyo (JP)

(72) Inventors: Qiang Huang, Nanjing (CN); Hu Cao, Nanjing (CN); Xinfeng Liu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 171 days.

(21) Appl. No.: 15/297,585

(22) Filed: Oct. 19, 2016

(51) Int. Cl.
*G06F 21/56* (2013.01)
*G06F 21/53* (2013.01)

(52) U.S. Cl.
CPC .......... *G06F 21/566* (2013.01); *G06F 21/53* (2013.01); *G06F 2221/033* (2013.01)

(58) Field of Classification Search
CPC ... G06F 21/63; G06F 21/566; G06F 2221/033
See application file for complete search history.

(56) References Cited

U.S. PATENT DOCUMENTS

| | | | |
|---|---|---|---|
| 6,434,741 B1 * | 8/2002 | Mirani | G06F 11/3628 714/E11.209 |
| 8,990,939 B2 | 3/2015 | Staniford et al. | |
| 9,071,638 B1 | 6/2015 | Aziz et al. | |
| 9,106,694 B2 | 8/2015 | Aziz et al. | |
| 9,159,035 B1 | 10/2015 | Ismael et al. | |
| 9,171,160 B2 | 10/2015 | Vincent et al. | |
| 9,400,889 B2 * | 7/2016 | Chess | G06F 9/44 |
| 2005/0251791 A1 | 11/2005 | Hundt | |
| 2006/0200807 A1 | 9/2006 | Bates et al. | |
| 2009/0077544 A1 | 3/2009 | Wu | |
| 2014/0380474 A1 | 12/2014 | Paithane et al. | |

OTHER PUBLICATIONS

Control flow graph—from Wikipedia, the free encyclopedia, 4 sheets [retrieved on Nov. 2, 2015], retrieved from the internet: https://en.wikipedia.org/wiki/Control_flow_graph.

* cited by examiner

*Primary Examiner* — Dao Q Ho
(74) *Attorney, Agent, or Firm* — Okamoto & Benedicto LLP

(57) ABSTRACT

A malware detection system for evaluating sample programs for malware incorporates an evasion code detector. The evasion code detector includes semantic patterns for identifying conditional statements and other features employed by evasion code. The system inserts breakpoints at conditional statements, compares expected and actual evaluated values of conditional variables of the conditional statements, and changes the execution path of the sample program based on the comparison. Changing the execution path of the sample program to an expected execution path counteracts the evasion code, allowing for the true nature of the sample program to be revealed during runtime.

10 Claims, 6 Drawing Sheets

```
.data:0042A297 push    ebp
.data:0042A298 mov     ebp, esp
.data:0042A29A sub     esp, 214h
.data:0042A2A0 push    ebx
.data:0042A2A1 push    esi
.data:0042A2A2 push    edi
.data:0042A2A3 mov     esi, eax
.data:0042A2A5 lea     eax, [ebp-214h]
...
.data:0042A318 push    ebx
.data:0042A319 push    eax
.data:0042A31A push    edi
.data:0042A31B call    ds:off_401324         ; shlwapi.dll_StrCmpNIW
.data:0042A321 test    eax, eax
.data:0042A323 jnz     short loc_42A341
.data:0042A325 mov     eax, dword_432820
.data:0042A32A lea     eax, [esi+eax+2]
.data:0042A32E push    eax
.data:0042A32F lea     eax, [ebp-2Ch]
.data:0042A332 push    eax
.data:0042A333 call    ds:off_40129C         ; kernel32.dll_lstrcmpiW
.data:0042A339 test    eax, eax
.data:0042A33B jnz     short loc_42A341
.data:0042A33D mov     al, 1
.data:0042A33F jmp     short loc_42A343
.data:0042A341
.data:0042A341 loc_42A341:
.data:0042A341 xor     al, al
.data:0042A343
.data:0042A343 loc_42A343:
.data:0042A343 pop     edi
.data:0042A344 pop     esi
.data:0042A345 pop     ebx
.data:0042A346 leave
.data:0042A347 retn
```

*Check if launched from the specific path "C:\Documents and Settings\Administrator\Application Data"* — 202

*Check if sample name contained the specific string "puemg.exe"* — 203

```
.text:004088636 mov     eax, [ebp+70h+var_C]
.text:004088639 call    loc_42A297
.text:00408863E test    al, al
.text:004088640 jz      loc_4088C6
.text:004088646 call    near ptr dword_412820+378h
.text:00408864B xor     ebx, ebx
.text:00408864D inc     ebx
.text:00408864E push    ebx
.text:00408864F lea     eax, [ebp+70h+var_8C]
.text:004088652 push    eax
.text:004088653 push    esi
.text:004088654 call    sub_407E94
.text:004088659 lea     eax, [ebp+70h+var_8C]
.text:00408865C push    eax
.text:00408865D push    ebx
.text:00408865E push    offset unk_432AFC
.text:004088663 call    ds:off_4010DC
.text:004088669 cmp     eax, esi
.text:00408866B jz      short loc_408677
.text:00408866D call    sub_41BD28
.text:004088672 mov     [ebp+70h+var_8], eax
.text:004088675 jmp     short loc_40867A
...
.text:004088C6 loc_4088C6:
.text:004088C6 push    [ebp+70h+var_C]
.text:004088C9 call    sub_418160
.text:004088CE mov     al, [ebp+70h+var_1]
.text:004088D1 pop     edi
.text:004088D2 pop     esi
.text:004088D3 pop     ebx
.text:004088D4 add     ebp, 70h
.text:004088D7 leave
.text:004088D8 retn    8
```

FIG. 2A

```
.text:00408636 mov      eax, [ebp+70h+var_C]
.text:00408639 call     loc_42A297
.text:0040863E test     al, al
.text:00408640 jz       loc_4088C6
.text:00408646 call     near ptr dword_412820+378h
.text:0040864B xor      ebx, ebx
.text:0040864D inc      ebx
.text:0040864E push     ebx
.text:0040864F lea      eax, [ebp+70h+var_8C]
.text:00408652 push     eax
.text:00408653 push     esi
.text:00408654 call     sub_407E94
.text:00408659 lea      eax, [ebp+70h+var_8C]
.text:0040865C push     eax
.text:0040865D push     ebx
.text:0040865E push     offset unk_432AFC
.text:00408663 call     ds:off_4010DC
.text:00408669 cmp      eax, esi
.text:0040866B jz       short loc_408677
.text:0040866D call     sub_41BD28
.text:00408672 mov      [ebp+70h+var_8], eax
.text:00408675 jmp      short loc_40867A
```

FIG. 2B

```
.text:004088C6 loc_4088C6:
.text:004088C6
.text:004088C6 push     [ebp+70h+var_C]
.text:004088C9 call     sub_418160
.text:004088CE mov      al, [ebp+70h+var_1]
.text:004088D1 pop      edi
.text:004088D2 pop      esi
.text:004088D3 pop      ebx
.text:004088D4 add      ebp, 70h
.text:004088D7 leave
.text:004088D8 retn     8
```

FIG. 2C

```
.data:0042A297 push    ebp
.data:0042A298 mov     ebp, esp
.data:0042A29A sub     esp, 214h
.data:0042A2A0 push    ebx
.data:0042A2A1 push    esi
.data:0042A2A2 push    edi
.data:0042A2A3 mov     esi, eax
.data:0042A2A5 lea     eax, [ebp-214h]
```

FIG. 2D

```
.data:0042A318 push    ebx
.data:0042A319 push    eax
.data:0042A31A push    edi
.data:0042A31B call    ds:off_401324           ; shlwapi.dll_StrCmpNIW
.data:0042A321 test    eax, eax
.data:0042A323 jnz     short loc_42A341
.data:0042A325 mov     eax, dword_432B20
.data:0042A32A lea     eax, [esi+eax+2]
.data:0042A32E push    eax
.data:0042A32F lea     eax, [ebp-2Ch]
.data:0042A332 push    eax
.data:0042A333 call    ds:off_40129C           ; kernel32.dll_lstrcmpiW
.data:0042A339 test    eax, eax
.data:0042A33B jnz     short loc_42A341
.data:0042A33D mov     al, 1
.data:0042A33F jmp     short loc_42A343
.data:0042A341
.data:0042A341
.data:0042A341 loc_42A341:
.data:0042A341
.data:0042A341 xor     al, al
.data:0042A343
.data:0042A343 loc_42A343:
.data:0042A343 pop     edi
.data:0042A344 pop     esi
.data:0042A345 pop     ebx
.data:0042A346 leave
.data:0042A347 retn
```

FIG. 2E

ANTI-MALWARE SYSTEM WITH EVASION CODE DETECTION AND RECTIFICATION

BACKGROUND OF THE INVENTION

1. Field of the Invention

The present invention relates generally to computer security, and more particularly but not exclusively to dynamic analysis of malware.

2. Description of the Background Art

Malware may be detected using so-called dynamic analysis, which involves running and monitoring the behavior of the malware. The dynamic analysis is typically performed in a sandbox, such as a suitably-configured virtual machine. One problem with dynamic analysis is that the analysis is typically performed on a single execution path, making the analysis vulnerable to evasion techniques, such as evasion codes. Evasion codes allow the malware to perform normally, i.e., without performing malicious actions, unless the malware detects that it is running in a particular computing environment. This prevents malware with evasion code from being properly evaluated in a sandbox and other dynamic analysis platforms.

SUMMARY

In one embodiment, a malware detection system for evaluating sample programs for malware incorporates an evasion code detector. The evasion code detector includes semantic patterns for identifying conditional statements and other features employed by evasion code. The system inserts breakpoints at conditional statements, compares expected and actual evaluated values of conditional variables of the conditional statements, and changes the execution path of the sample program based on the comparison. Changing the execution path of the sample program to an expected execution path counteracts the evasion code, allowing for the true nature of the sample program to be revealed during runtime.

DESCRIPTION OF THE DRAWINGS

FIG. 2A shows an analysis performed by the inventors on a sample program that comprises malware with evasion code.

FIGS. 2B-2E show larger views of the code of the sample program of FIG. 2A.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
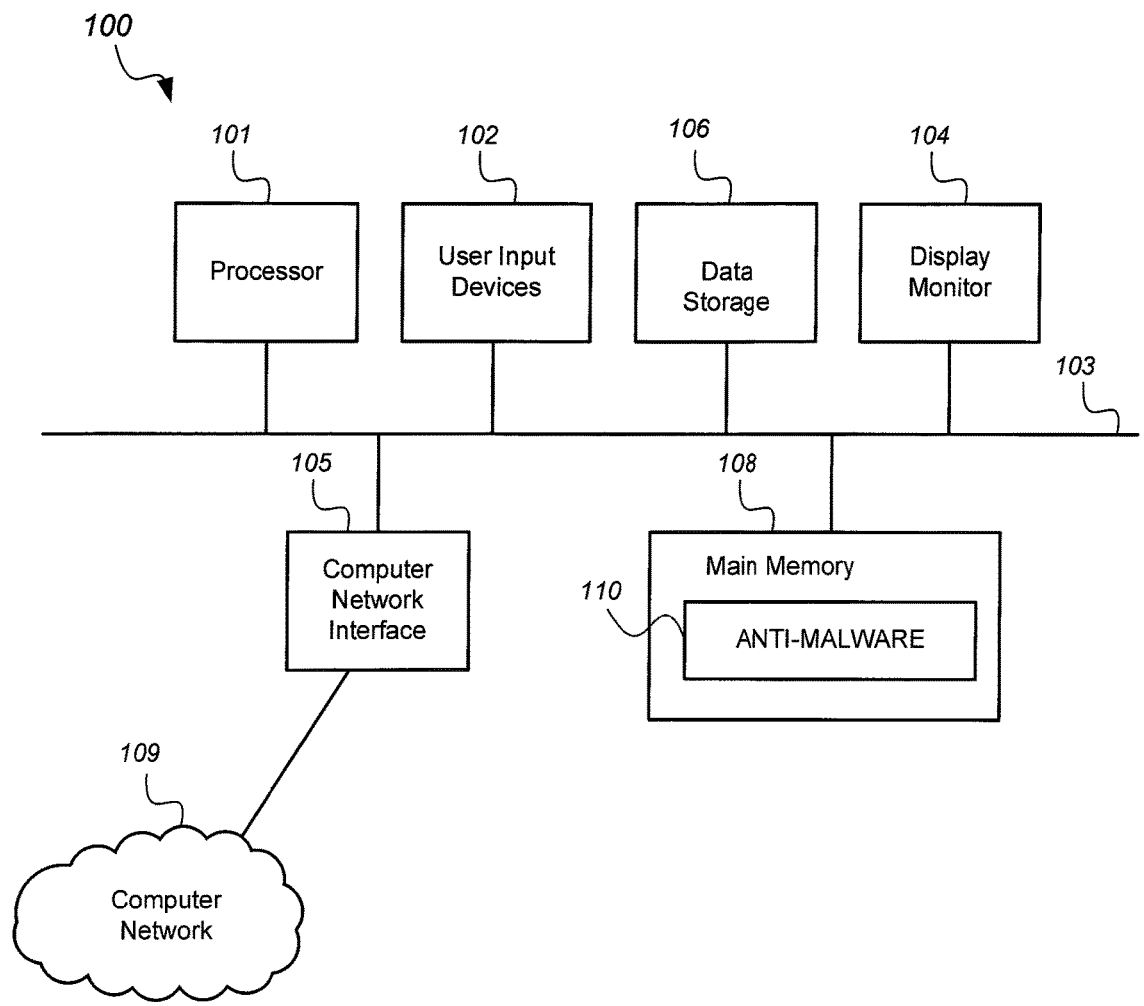
FIG. 1 shows a schematic diagram of a computer system in accordance with an embodiment of the present invention.

Referring now to FIG. 1, there is shown a schematic diagram of a computer system 100 in accordance with an embodiment of the present invention. The computer system 100 may be employed as a malware detection system that is configured to perform dynamic analysis of sample programs being evaluated for malware. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules, comprising instructions stored non-transitory in the main memory 108 for execution by the processor 101. An article of manufacture may be embodied as computer-readable storage medium including instructions that when executed by the processor 101 of the computer system 100 causes the computer system 100 to be operable to perform the functions of the one or more software modules. In the example of FIG. 1, the software modules comprise an anti-malware module 110. The anti-malware module 110 may be configured to detect evasion code and allow program execution to be rectified to allow for proper dynamic analysis of sample programs.

In the example of FIG. 1, the anti-malware module 110 is implemented in software for illustration purposes only. In other embodiments, the anti-malware module 110 may be implemented in hardware (e.g., application-specific integrated circuit, logic circuit) or combination of hardware and software. As will be more apparent below, the anti-malware module 110 improves the computer system 100 itself by rendering evasion code ineffective, thereby allowing for evaluation of the true nature of a sample program being analyzed for malware.

FIG. 2A shows an analysis performed by the inventors on a sample program that comprises malware (ZBOT Trojan) with evasion code. FIG. 2A shows a snippet, i.e., a portion, of the malware. FIGS. 2B-2D show larger views of the code of FIG. 2A. More particularly, FIG. 2B shows memory locations 0x408636 to 0x00408675, FIG. 2C shows memory locations 0x4088C6 to 0x4088D8, FIG. 2D shows memory locations 0x42A297 to 0x42A2A5, and FIG. 2E shows memory locations 0x42A318 to 0x42A347. The interactions among data and instructions in these memory locations as analyzed by the inventors are shown in FIG. 2A.

Continuing in the example of FIG. 2A, the malware's code is obfuscated by encryption that makes it difficult to perform a static evaluation of the malware. At runtime, i.e., when the malware is executed, the malware automatically de-obfuscates, revealing code at memory location 0x408639 that calls a subprogram at memory location 0x42a297 (see arrow 201) to check current program runtime status. More particularly, the subprogram performs two checks, a first check at memory location 0x42a31b (see arrow 202) and a second check at memory location 0x42a333 (see arrow 203). The first check determines whether or not the sample program was launched from a specific file location of "C:\Documents and Settings\Administrator\Application Data" by calling the application programming interface (API) of shlwapi.dll_StrCmpNIW. The second check determines whether or not the name of the sample program contains a specific random string, such as "puemg.exe", using the string compare function "kernel32.dll_lstrcmpiW." When either of the two checks fail, i.e., the sample program was not launched from the specific file location or does not contain the specific string in its name, the sample program jumps to the memory location 0x4088c6 to exit the program (see arrow 204) and thereby evade detection. When both of the checks pass, the sample program executes its malicious code (see 205) for performing malicious behavior, such as injecting processes and connecting to remote servers, etc. With typical dynamic analysis systems, at least one of the two checks will fail, preventing execution of the malicious code of the sample program.

The sample program of FIG. 2A comprises evasion code that may be generalized as posing a semantic problem of control dependency to evade dynamic analysis. The evasion code includes a series of instructions that check for specific system or program state, and the results of the checks dictate the selection of execution path during runtime. The checking and results of the checking form semantic connections between the data of the state being checked and the control of execution path. As in the sample program of FIG. 2A, the dependency on the system or program state forms the core of the evasion technique. Embodiments of the present invention narrow down the dependency on the semantic aspect of the control dependency, to exclude the data dependency in real situations, such as using previously read data for future processing in the program. Data dependency is not only employed for evasion, but also in subprograms (e.g., functions, subroutines, procedures, etc.) of normal programs (i.e., non-malicious). Accordingly, embodiments of the present invention focus on the semantic connections formed by system or program state and control dependency.

The evasion technique of the sample program of FIG. 2A is relatively simple, but is very effective in defeating dynamic analysis in a sandbox. Unfortunately, the semantic of control dependency varies in different situations and samples. Manually identifying the evasion technique of sample programs is not feasible given the large number of possible variations between sample programs. Also, even when a sample program has data dominated control dependency, the interpretation of the semantic involved confuses dynamic analyzers. That is, the what, how and why a checked status dictates the execution path are relatively difficult to describe in a level of program analysis, especially for binary instructions. In one embodiment, the above-noted problems with evaluating sample programs that employ evasion code are addressed by describing and identifying evasion technique for semantic of control dependency and make corresponding runtime patches to the sample program to counteract the evasion code.

Figure 3:
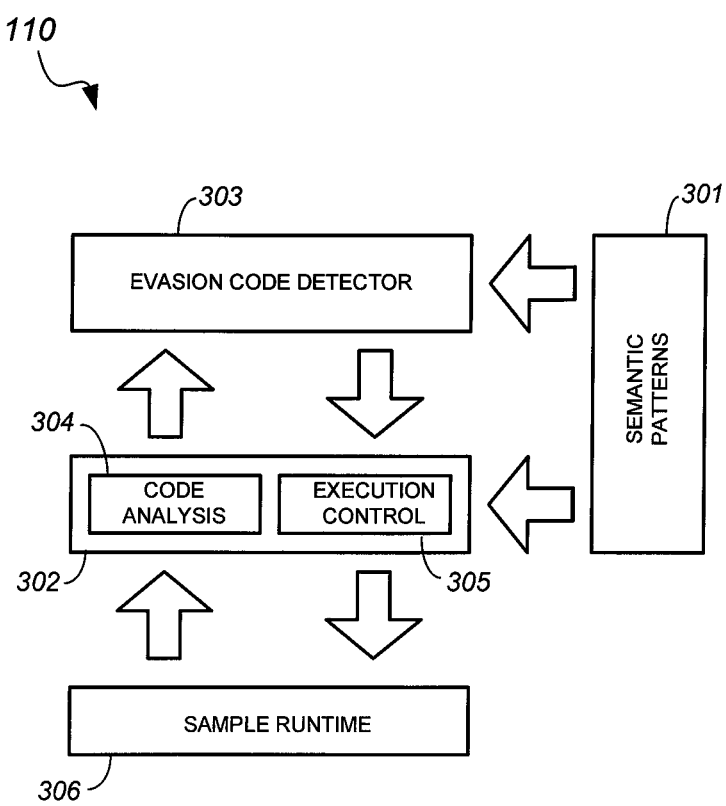
FIG. 3 shows a logical diagram of an evasion code detection section of an anti-malware module in accordance with an embodiment of the present invention.

FIG. 3 shows a logical diagram of an evasion code detection section of the anti-malware module 110 in accordance with an embodiment of the present invention. In the example of FIG. 3, the anti-malware module 110 comprises semantic patterns configuration 301, an analysis platform 302, and an evasion code detector 303. The anti-malware module 110 may include other modules for detecting malware in general, but those modules are not shown in FIG. 3 for clarity of illustration. In the example of FIG. 3, a sample program being evaluated for malware is analyzed during runtime (see 306). The sample program is also simply referred to herein as the "sample", and the binary code of the sample program is also simply referred to herein as the "sample binary."

In one embodiment, the anti-malware module 110 is configured to automatically detect and rectify evasion code during runtime. In one embodiment, a pattern-based method is used to trigger the detection process. Once detected, the anti-malware module 110 marks the evasion code, and rectifies the execution path to a desired path, thereby causing the sample to continue operation and reveal its malicious intentions. During execution of the sample, the anti-malware module 110 may perform dynamic analysis of the sample to detect whether or not the sample comprises malware. The anti-malware module 110 may employ suitable conventional dynamic analysis algorithms to evaluate the sample for malware without detracting from the merits of the present invention. As can be appreciated, regardless of the dynamic analysis algorithm employed, embodiments of the present invention allow the dynamic analysis to be properly performed on the sample by counteracting evasion code.

The semantic patterns configuration 301 may comprise a configuration file that includes semantic patterns of control dependency. A semantic pattern may model data flow that impacts conditional statements. That is, the semantics of control dependency focuses on data flow to conditional variables, i.e., variables used in conditional statements (e.g., conditional jump instructions), for execution path selection, including how a conditional variable is influenced by operations, where the conditional variable is evaluated, and which execution path should be taken after the conditional variable is evaluated. The semantic patterns may be created by antivirus researchers from known malicious samples, such as those collected from honeypot systems, received from submissions, etc. Common features of evasion techniques may be analyzed and summarized as semantic patterns. In one embodiment, a semantic pattern is a tuple, with three fields, as follows:

<<conditionalStatements, semanticOperations, expectedConditions>>

The conditionalStatements ("conditional statements") may comprise a sequence of formalized conditional statements, and may be defined in the form of regular expressions. The conditional statements comprise conditional instructions, such as conditional jump instructions, for example.

The semanticOperations ("semantic operations") may comprise a set of API functions and related instructions that are invoked before the conditional statements are executed. The operations defined in the semanticOperations field are semantic operations in that they identify the very initial points where a specific semantic is generated, such as checking the system or program status. Generally speaking, these semantic operations are essential in creating the semantic of control dependency targeted to the conditional statements and variables defined in the conditionalStatements field. The semantic operations may be tracked during evaluation of the sample program to check if the conditional variables are assigned or somehow affected by the semantic operations. If so, the semantic of control dependency is established with the source of the semantic operations and the destination of conditional variables.

The expectedCondition ("expected condition") may be a Boolean value (i.e., TRUE or FALSE) of the expected value of the conditional statement defined in the conditionalStatements field. The Boolean value dictates the expected branch to be executed in the following procedure. In one embodiment, if the expected value of the conditional statement is the same as the actual evaluated value of the conditional statement during runtime, the execution path of the sample program is not rectified; in that case, the sample program is deemed to be executing instructions along the expected execution path. Otherwise, when the expected value is not the same as the actual evaluated value of the conditional statement, the execution path is rectified to make sure the correct execution path branch is taken.

In the example of FIG. 3, the analysis platform 302 comprises a code analysis module 304 and an execution control module 305. The analysis platform 302 may be implemented using a suitable disassembler and a debugger or a dynamic instrumentation tool, such as the PIN or the DynamoRIO dynamic binary instrumentation tool.

In one embodiment, the code analysis module 304 performs disassembly, intra-function, and inter-function analysis. The code analysis module 304 may be configured to analyze various code formats, such as assembly language, high level programming languages (including script languages), and so on. For example, the code analysis module 304 may be configured to disassemble the sample binary. The disassembly process translates the sample binary into assembly code, which may be used by the code analysis module 304 to construct a control flow graph of the sample. The code analysis module 304 may represent the control flow graph in data format, as opposed to pictorially. The control flow graph allows the code analysis modules 304 to identify subprograms and branching statements called by the sample. In the construction of the control flow graph, the global relationships among all subprograms in the sample binary may be identified during inter-function analysis and the relationships in each individual subprogram may be identified during intra-function analysis. The code analysis module 304 may employ any suitable algorithm in constructing a control flow graph and branching statements and subprogram calls in the control flow graph, including algorithms described in the book "Modern Compiler Implementation in C" by Andrew W. Apple.

In one embodiment, the execution control module 305 is configured to set breakpoints and to monitor and modify the process context of the sample during execution. In one embodiment, the execution control module 305 operates similarly to a debugger. The execution control module 305 may set breakpoints in the image space of the sample binary to allow evasion code detection and execution path correction. The execution control module 305 allows the context during runtime of the sample, registers, and stack and memory values to be monitored and modified, if necessary, in order to alter the program execution path.

In one embodiment, the evasion code detector 303 is configured to detect evasion code based on the sematic patterns included in the semantic patterns configuration 301. Generally, evasion code detection process may be initiated by the evasion code detector 301 when a breakpoint is hit. The evasion code detector 303 may identify portions of the sample that match one or more semantic patterns that are stored in the semantic patterns configuration 301.

In one embodiment, the evasion code detector 303 locates conditional statements (e.g., defined in the conditionalStatements field of a semantic pattern) and determines if the semantic of control dependency (e.g., defined in the semanticOperations field of the semantic pattern) affects conditional variables of the conditional statements. If so, the evasion code detector 303 sets a new breakpoint on the conditional statement where the conditional variable is going to be evaluated. In one embodiment, the execution path is deemed to be normal and accordingly not rectified only when the expected value (e.g., expectedCondition field of the semantic pattern) and the actual evaluated value of the conditional variable during runtime are identical. Otherwise, the execution context of the sample is modified to so that the expected branch will be taken by the sample when execution of the sample resumes.

Figure 4:
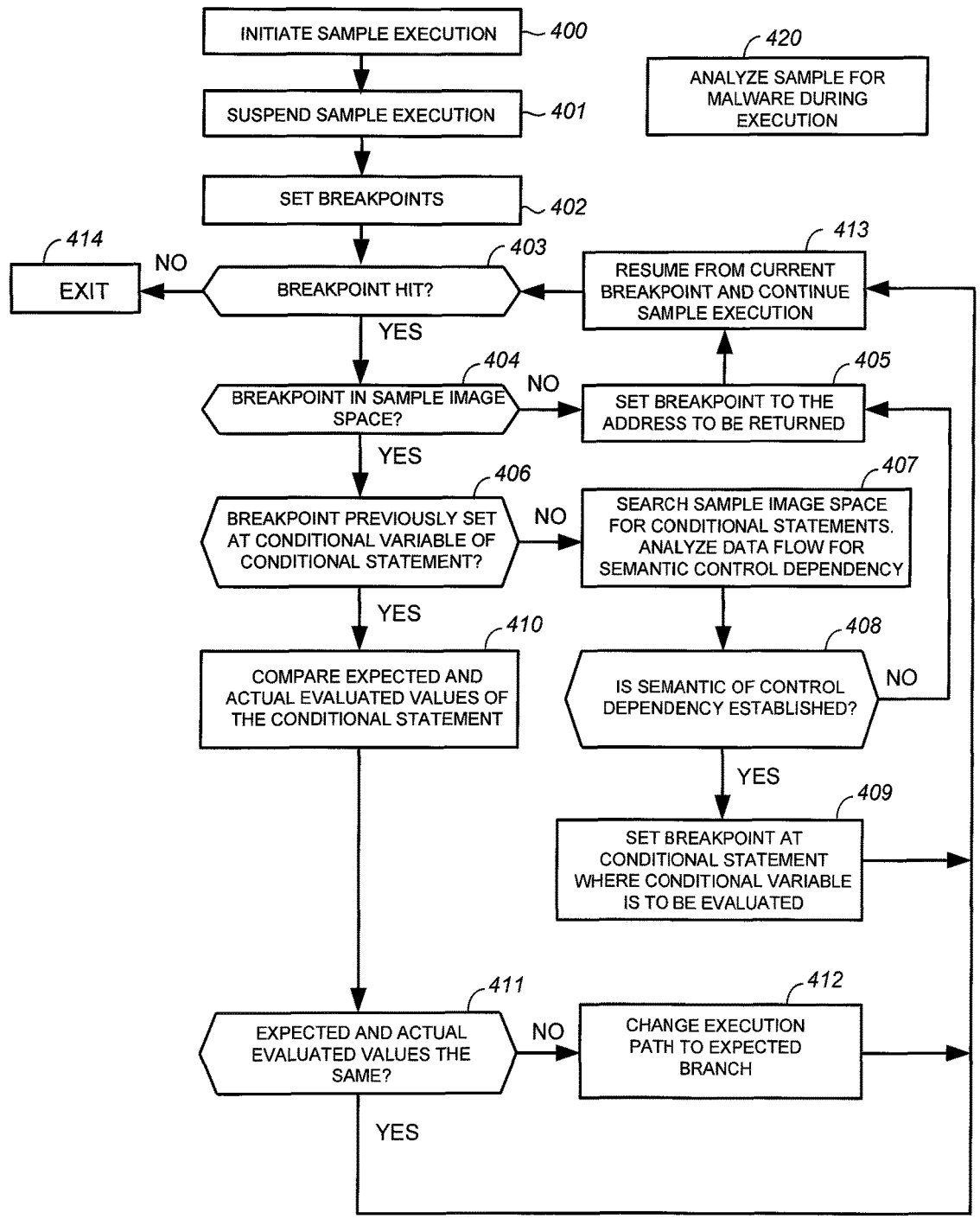
FIG. 4 shows a flow diagram of a method of evaluating a sample program that has evasion code in accordance with an embodiment of the present invention.

FIG. 4 shows a flow diagram of a method of evaluating a sample program that has evasion code in accordance with an embodiment of the present invention. The method of FIG. 4 may be performed by a malware detection system, such as a computer system 100 with an anti-malware module 110. Other components may also be employed without detracting from the merits of the present invention.

In the example of FIG. 4, execution of a sample being evaluated for malware is initiated (step 400). The execution of the sample may be initiated by starting the sample process, i.e., the process of the sample in main memory, or by attaching the sample process on an existing process. The execution of the sample may be paused and suspended at the very moment when the sample process is started or attached (step 401). One or more breakpoints are then set (step 402). Breakpoints may be set on one or more API functions and subprograms that are located in the image space of the sample and/or in external module space. The breakpoints may be set on API functions and instructions that malware typically exploit and use. The breakpoints may be selected by antivirus researchers based on analysis of known malware. The execution of the sample is resumed after the breakpoints are set.

The malware detection system waits for a breakpoint to be hit (step 403). When a breakpoint is hit, the malware detection system determines where the breakpoint is located (step 404). When the hit breakpoint is not located in the image space of the sample (step 404 to step 405), this indicates that an external API function was called. In that case, the runtime context may be analyzed to determine the address where the external API function was called. The address to be returned by the called external API function may be set as a new breakpoint (step 405). Thereafter, the malware detection system resumes execution from the current breakpoint (step 405 to step 413).

Generally speaking, the detection of evasion code is initiated when a breakpoint is hit in the image space of the sample. When a breakpoint is hit in the image space of the sample (step 404 to step 406), the malware detection system determines if the breakpoint was previously set at a conditional variable that is being evaluated (step 406). More particularly, as will be more apparent below in another step (see step 409), a breakpoint may be set at a conditional variable of a conditional statement, to allow for determination of the value of the conditional variable at runtime.

When a breakpoint is hit in the image space of the sample and the breakpoint was not previously set a conditional statement being evaluated (step 406 to step 407), the malware detection system searches the image space of the sample for conditional statements that are defined in the semantic patterns that are included in the semantic patterns configuration 301. A data flow analysis may be performed to determine if the semantic operations (defined with the conditional statements in the semantic pattern) affect conditional variables of the conditional statements by way of assignment or other operation.

The malware detection system checks if the semantic of control dependency is established (step 408). In one embodiment, the semantic of control dependency is established when data flow from semantic operations (defined in the semanticOperations field of a semantic pattern) to a conditional variable of a corresponding conditional statement (defined in the conditionalStatements field of the semantic pattern) is confirmed. More particularly, the malware detection system may determine if a conditional statement defined in a particular semantic pattern and found in the image space of the sample, is affected by preceding semantic operations that are defined in the particular semantic pattern. This is the case when the value of a conditional variable of the conditional statement depends on the preceding semantic operations.

When the semantic of control dependency cannot be established between the conditional statement and the preceding semantic operations, the malware detection system determines the address from where the current subprogram was called, and set a new breakpoint on the address to be returned by the called API or subprogram (step 408 to step 405), in order to start a next round of execution.

Otherwise, when the semantic of control dependency can be established between the conditional statement and the preceding semantic operations, a new breakpoint is set on the conditional statement where a conditional variable is going to be evaluated (step 408 to step 409). The malware detection system thereafter resumes execution from the current breakpoint (step 409 to step 413).

As previously noted, when a breakpoint is hit in the image space of the sample (step 404 to step 406), the malware detection system determines if the breakpoint was previously set at a conditional statement that is being evaluated (step 406). If so (step 406 to step 410), the actual evaluated value of the conditional statement at runtime is compared to the expected value of the conditional statement as defined in the expectedCondition field of the corresponding semantic pattern (step 410 to step 411). When the expected and actual evaluated values of the conditional statement are the same (step 411 to step 413), this indicates that the sample program is taking the expected/normal execution path. In that case, the malware detection system simply resumes execution from the current breakpoint without changing the execution path (step 411 to step 413).

Otherwise, when the expected and actual evaluated values of the conditional statement are not the same, the malware detection system changes the execution path to the expected branch (step 411 to step 412). More particularly, in this case, the current context, such as certain flag registers, may be modified to inverse the actual evaluated value of a conditional variable being evaluated, so that the expected branch is taken. For example, the actual evaluated value of the conditional variable may be inversed (e.g., from TRUE to FALSE, or from FALSE to TRUE), so that the execution path that is being hidden by the evasion code is taken. Instead of inversing the conditional variable, other ways of changing the execution path may also be performed including jumping directly to the address of instructions to be executed, altering the value of the program counter register (e.g., EIP in x86 architecture) to the address of the expected branch, etc. Thereafter, the malware detection system resumes execution from the current breakpoint (step 412 to step 413). Breakpoints where rectification have already been performed may be removed. The runtime behavior of the sample is analyzed during execution in the malware detection system (step 420). As can be appreciated, by rectifying the execution path of the sample, malicious code that otherwise may be bypassed are executed, thereby allowing for proper dynamic analysis of the sample.

The evaluation of the sample is ended when no breakpoint is hit (step 403 to step 414). It is to be noted that although some breakpoints may still be in the sample, these breakpoints will no longer be in the execution path or have already been executed through a loop a limited number of times, and thus no longer hit during execution.

As a particular example, TABLE 1 shows an example semantic pattern for detecting and rectifying evasion code in the sample program of FIG. 2A, which is the ZBOT Trojan malware.

TABLE 1

<<conditionalStatements : ["call.*(0x)*[0-9a-f]+", "test\s*al,\s*al", "(jz|je)\s*(0x)[0-9a-f]+"],
semanticOperations : {"shlwapi.dll_StrCmpNIW", "kernel32.dll_lstrcmpiW"},
expected Condition: FALSE>>

The malware detection system set the API function of GetVolumeNameForVolumeMountPointW in kernel32.dll as the initial breakpoint. From analysis of other malware, the just-mentioned API function has been found to be a good indicator that de-obfuscation code have already executed, thereby facilitating analysis of obfuscated malware. More particularly, when the API function is called, de-obfuscation routines, such as unpacking and decryption, are usually finished, leaving plain code exposed for analysis. The malware detection system facilitated the dynamic analysis of the malware iteratively and recursively by retrieving and setting breakpoints as previously described. When the address at memory location 0x4088ed (part of the ZBOT Trojan malware; not shown in FIG. 2A) is hit, which is the returned address found and set in the previous round of execution, the current round analysis is initiated. Being invoked by a "call 0x4085da" instruction through the analysis, a subprogram started in memory location 0x4085da (part of the ZBOT Trojan malware; not shown in FIG. 2A) is added in the queue for further semantic investigation. The malware detection system then checks the called subprogram for control dependency recursively.

Continuing with the evaluation of the sample of FIG. 2A, the malware detection system identifies the conditional statements in the subprogram of 0x4085da from the memory locations 0x408639 to 0x408640, and the invoked semantic operations of string compare in the subprogram that starts at the memory location 0x42a297 from the conditionalStatements, semanticOperations and semanticOperationsCount fields defined in the semantic pattern of TABLE 1. The semantic of control dependency is established when the result of string compare operations stored in the AL register dictated the selection of the next execution branches. The malware detection system then sets a new breakpoint on the conditional variable of the conditional statement at memory location 0x408640 to make sure that the execution path takes the FALSE branch.

In the following round of execution, the breakpoint previously set at the memory location 0x408640 is hit. Based on the current context indicating that the value of the AL register is zero, the actual evaluated value for the conditional statement "jz 0x4088c6" is TRUE. This means that the execution path will take the TRUE branch to the memory location 0x4088c6, which is contrary to what is expected based on the semantic pattern (which indicates an expected value of FALSE for the conditional statement). Accordingly, the malware detection system inverses the ZF flag in the EFLAG register to change the execution path to the FALSE branch, i.e., to the memory location 0x408646 that follows the conditional statement. This allows the malicious code (FIG. 2A, 205) that start at the FALSE branch to be executed, thereby be exposing the malicious code for dynamic analysis.

Methods and systems for detecting and counteracting evasion code have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of detecting malware, the method comprising:
    executing a sample program in a dynamic analysis system;
    during runtime of the sample program in the dynamic analysis system, identifying a conditional statement of the sample program that matches a conditional statement indicated in a semantic pattern of a plurality of semantic patterns, wherein the conditional statement comprises a conditional jump instruction, wherein the execution path of the sample program is changed when an expected value of a conditional variable of the conditional jump instruction as indicated in the semantic pattern is not the same as an actual evaluated value of the conditional variable;
    setting a breakpoint at the conditional statement;
    when the breakpoint is hit, comparing an expected value of the conditional statement as indicated in the semantic pattern to an actual evaluated value of the conditional statement;
    changing execution path of the sample program based on a result of the comparison of the expected and actual evaluated values of the conditional statement, wherein changing the execution path of the sample program comprises inversing a Boolean value of the conditional variable; and
    monitoring a behavior of the sample program for malware during runtime of the sample program in the dynamic analysis system.

2. The computer-implemented method of claim 1, wherein the dynamic analysis system comprises a virtual machine that is configured as a sandbox.

3. The computer-implemented method of claim 1, wherein the execution path of the sample program is changed when the expected value of the conditional statement as indicated in the semantic pattern is not the same as the actual evaluated value of the conditional statement.

4. The computer-implemented method of claim 1, wherein the semantic pattern identifies application programming interface (API) functions that are invoked before the conditional statement.

5. The computer-implemented method of claim 1, further comprising removing the breakpoint after the breakpoint is hit.

6. A system for detecting malware, the system comprising:
    a computer system with a memory and a processor, the processor being configured to execute instructions in the memory to cause the computer system to execute a sample program in a dynamic analysis system,
    identify a conditional statement of the sample program that matches a conditional statement indicated in a semantic pattern of a plurality of semantic patterns during runtime of the sample program, wherein the conditional statement comprises a conditional jump instruction, wherein the execution path of the sample program is changed when an expected value of a conditional variable of the conditional jump instruction as indicated in the semantic pattern is not the same as an actual evaluated value of the conditional variable,
    set a breakpoint at the conditional statement,
    compare an expected value of the conditional statement as indicated in the semantic pattern to an actual evaluated value of the conditional statement,
    change execution path of the sample program based on a result of the comparison, wherein changing the execution path of the sample program comprises inversing a Boolean value of the conditional variable, and
    monitor a behavior of the sample program for malware during runtime of the sample program.

7. The system of claim 6, wherein the sample program is executed in a virtual machine hosted by the computer system.

8. The system of claim 6, wherein the execution path of the sample program is changed when the expected value of the conditional statement as indicated in the semantic pattern is not the same as the actual evaluated value of the conditional statement.

9. A non-transitory computer-readable medium comprising instructions stored thereon, that when executed by a processor, perform the steps of:
    executing a sample program in a dynamic analysis system;
    during runtime of the sample program, identifying a conditional statement of the sample program that matches a conditional statement indicated in a semantic pattern of a plurality of semantic patterns, wherein the conditional statement comprises a conditional jump instruction, wherein the execution path of the sample program is changed when an expected value of a conditional variable of the conditional jump instruction as indicated in the semantic pattern is not the same as an actual evaluated value of the conditional variable;
    setting a breakpoint at the conditional statement;
    when the breakpoint is hit, comparing an expected value of a conditional variable of the conditional statement as indicated in the semantic pattern to an actual evaluated value of the conditional variable of the conditional statement;
    changing execution path of the sample program based on a result of the comparison, wherein changing the execution path of the sample program comprises inversing a Boolean value of the conditional variable; and
    monitoring a behavior of the sample program for malware during runtime of the sample program.

10. The non-transitory computer-readable medium of claim 9, wherein the dynamic analysis system comprises a virtual machine that is configured as a sandbox.

* * * * *